United States Patent
Hu et al.

(10) Patent No.: US 11,211,667 B2
(45) Date of Patent: Dec. 28, 2021

(54) BATTERY MODULE AND BATTERY PACK

(71) Applicant: Contemporary Amperex Technology Co., Limited, Ningde (CN)

(72) Inventors: Guoliang Hu, Ningde (CN); Chao Zeng, Ningde (CN); Xianchun Zhu, Ningde (CN); Quan Yang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 207 days.

(21) Appl. No.: 16/684,595

(22) Filed: Nov. 15, 2019

(65) Prior Publication Data
US 2020/0350536 A1 Nov. 5, 2020

(30) Foreign Application Priority Data
Apr. 30, 2019 (CN) .......................... 201910359968.6

(51) Int. Cl.
| H01M 2/12 | (2006.01) |
| H01M 2/02 | (2006.01) |
| H01M 10/6557 | (2014.01) |
| H01M 10/613 | (2014.01) |
| H01M 50/30 | (2021.01) |
| H01M 50/258 | (2021.01) |
| H01M 10/48 | (2006.01) |

(52) U.S. Cl.
CPC .......... *H01M 50/30* (2021.01); *H01M 10/613* (2015.04); *H01M 10/6557* (2015.04); *H01M 50/258* (2021.01); *H01M 10/48* (2013.01); *H01M 10/482* (2013.01); *Y02E 60/10* (2013.01)

(58) Field of Classification Search
None
See application file for complete search history.

(56) References Cited

U.S. PATENT DOCUMENTS

| 2011/0012560 | A1* | 1/2011 | Sakakibara | ......... H01M 10/441 320/118 |
| 2013/0337299 | A1 | 12/2013 | Sugawara | |
| 2019/0372083 | A1* | 12/2019 | Ryu | ..................... H01M 50/557 |

FOREIGN PATENT DOCUMENTS

| CN | 105762432 A | 7/2016 |
| CN | 205564914 U | 9/2016 |
| CN | 108565515 A | 9/2018 |

(Continued)

OTHER PUBLICATIONS

PCT International Search Report for PCT/CN2020/081769, dated May 27, 2020, 11 pages.

(Continued)

*Primary Examiner* — Lisa S Park
(74) *Attorney, Agent, or Firm* — Law Offices of Liaoteng Wang (57) ABSTRACT

The present disclosure relates to a battery module and a battery pack. The battery module includes a plurality of secondary batteries arranged side by side, each of which includes a vent; a monitoring assembly, disposed above the plurality of secondary batteries and including a base plate and a monitoring wire, wherein the monitoring wire is coupled to the base plate; the monitoring wire is disposed corresponding to positions of the vents of the plurality of secondary batteries, and can be broken off when any of the vents bursts, so as to monitor a state of the battery module.

17 Claims, 8 Drawing Sheets

(56) References Cited

FOREIGN PATENT DOCUMENTS

| | | |
|---|---|---|
| CN | 108682756 A | 10/2018 |
| CN | 208538928 U | 2/2019 |
| CN | 109728374 A | 5/2019 |
| CN | 209730085 U | 12/2019 |
| CN | 209730091 U | 12/2019 |
| CN | 209822756 U | 12/2019 |
| CN | 209860056 U | 12/2019 |

OTHER PUBLICATIONS

The extended European search report for European Application No. 19210175.6, dated Jul. 30, 2020, 8 pages.

* cited by examiner

BATTERY MODULE AND BATTERY PACK

CROSS REFERENCE TO RELATED APPLICATION

This application claims priority to Chinese Patent Application No. 201910359968.6, filed on Apr. 30, 2019, which is hereby incorporated by reference in its entirety.

TECHNICAL FIELD

The present disclosure relates to a technical filed of batteries, and particularly relates to a battery module and a battery pack.

BACKGROUND

As an energy density of a secondary battery increases, market demand for battery safety is increasing. During use of the secondary battery, thermal runaway may occur, which may form a high temperature environment in some regions and bring a great damage. In severe cases, an upper cover of a battery case may be burnt through and a fire may be caused. However, since the thermal runaway of the secondary battery cannot be timely detected currently, a great safety accident may be caused.

SUMMARY

On one aspect, the embodiments of the present disclosure disclose a battery module, including: a plurality of secondary batteries arranged side by side, each of which includes a vent; a monitoring assembly, disposed above the plurality of secondary batteries and including a base plate and a monitoring wire, wherein the monitoring wire is coupled to the base plate; the monitoring wire is disposed corresponding to positions of the vents of the plurality of secondary batteries, and can be broken off when any of the vents bursts, to monitor a state of the battery module.

According the one aspect of the embodiments of the present disclosure, the monitoring wire includes a first segment and a second segment spaced apart from each other in a width direction of the base plate, wherein a minimum spacing between the first segment and the second segment is indicated by H, and an outer diameter of the monitoring wire is indicated by D, wherein $H/D \geq 2.5$.

According the one aspect of the embodiments of the present disclosure, the monitoring wire has a U-shaped configuration.

According the one aspect of the embodiments of the present disclosure, the vent of each of the plurality of secondary batteries has a center line extending in a length direction of the base plate, and the first segment and the second segment are respectively disposed on two sides of the center line.

According the one aspect of the embodiments of the present disclosure, the outer diameter D of the monitoring wire is in a range of 0.1 mm≤D≤2 mm, and the minimum spacing H between the first segment and the second segment is in a range of 5 mm≤H≤50 mm.

According the one aspect of the embodiments of the present disclosure, the base plate is provided with a receiving portion, in which the monitoring wire is disposed, and the monitoring wire has a shape matching with a shape of the receiving portion.

According the one aspect of the embodiments of the present disclosure, the receiving portion is formed as a groove recessed in a thickness direction of the base plate, and the groove has a bottom wall without penetrating the base plate.

According the one aspect of the embodiments of the present disclosure, the receiving portion penetrates the base plate in a thickness direction of the base plate, wherein a maximum dimension of the monitoring wire in the thickness direction of the base plate is smaller than a thickness of the base plate, and the monitoring wire is disposed in the receiving portion.

According the one aspect of the embodiments of the present disclosure, the monitoring assembly further includes an insulating layer enclosing the monitoring wire, and the insulating layer is filled in the receiving portion, wherein the monitoring wire is coupled to the base plate via the insulating layer.

According the one aspect of the embodiments of the present disclosure, the insulating layer has a thickness indicated by M, and a maximum outer diameter of the monitoring wire is indicated by D, wherein $0.05 \leq M/D \leq 10$.

According the one aspect of the embodiments of the present disclosure, a portion of the insulating layer disposed below the monitoring wire has a thickness in the thickness direction equal to M.

According the one aspect of the embodiments of the present disclosure, the thickness M of the insulating layer is in a range of 0.1 mm≤M≤1 mm.

According the one aspect of the embodiments of the present disclosure, the monitoring assembly further includes a protective plate, which is disposed on a side of the base plate close to the plurality of secondary batteries in a thickness direction of the base plate.

According the one aspect of the embodiments of the present disclosure, the monitoring assembly further includes an isolating plate, which is disposed on a side of the base plate away from the plurality of secondary batteries in a thickness direction of the base plate.

On a further aspect, the embodiments of the present disclosure disclose a battery pack, including a battery module according to any of the above embodiments.

According to the further aspect of the embodiments of the present disclosure, there are two or more battery modules, and the monitoring wires included in the two or more battery modules are connected in series.

On a still further aspect, the embodiments of the present disclosure disclose a battery pack, including: a battery unit; a cover, disposed above the battery unit; and a monitoring assembly, which is disposed on the cover and includes a base plate and a monitoring wire, wherein the monitoring wire is coupled to the base plate, and when the battery unit bursts, the monitoring wire can be broken off to monitor a state of the battery unit.

BRIEF DESCRIPTION OF THE DRAWINGS

Features, advantages, and technical effects of the exemplary embodiments of the present disclosure will be described with reference to accompanying drawings.

In the accompanying drawings, the drawings are not drawn to scale.

REFERENCE NUMERALS 1, battery module;
11, secondary battery; 11a, center line; 111, vent;
12, monitoring assembly; 121, base plate; 121a, receiving portion; 122, monitoring wire;
122a, first segment; 122b, second segment; 122c, intermediate transition segment; 123, insulating layer;
13, protective plate;
14, isolating plate;
2, battery pack;
21, case;
22, cover;
3, battery pack;
31, battery unit;
X, width direction; Y, thickness direction; Z, length direction.

DETAILED DESCRIPTION

Below, embodiments of the present disclosure will be further described in detail with reference to the accompanying drawings and embodiments. The detailed description of the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientations or positional relationships indicated by the terms "upper", "lower", "left", "right", "inner", "outer" and the like are merely for the purpose of describing the present disclosure and simplifying the description, and are not intended to indicate or imply that the device or component referred to has a particular orientation, is constructed and operated in a particular orientation, and therefore cannot be understood to be a limitation of the present disclosure. Moreover, the terms "first", "second", "third" and the like are used for descriptive purposes only and are not to be construed as indicating or implying relative importance.

The orientations appearing in the following description are all directions shown in the accompanying drawings and are not intended to limit the specific configuration of the present disclosure. In the description of the present disclosure, it should be noted that, unless otherwise specified and stated clearly, the terms "install", "connect", and "couple" are to be understood broadly, and may be, for example, a fixed connection, a disassemble connection, or an integral connection, and may be a direct connection or an indirect connection via an intermediate medium. The specific meaning of the above terms in the present disclosure can be understood by the person skilled in the art according to actual circumstance.

In order to better understand the present disclosure, the embodiments of the present disclosure are described in detail below with reference to FIGS. 1 to 12.

Figure 1:
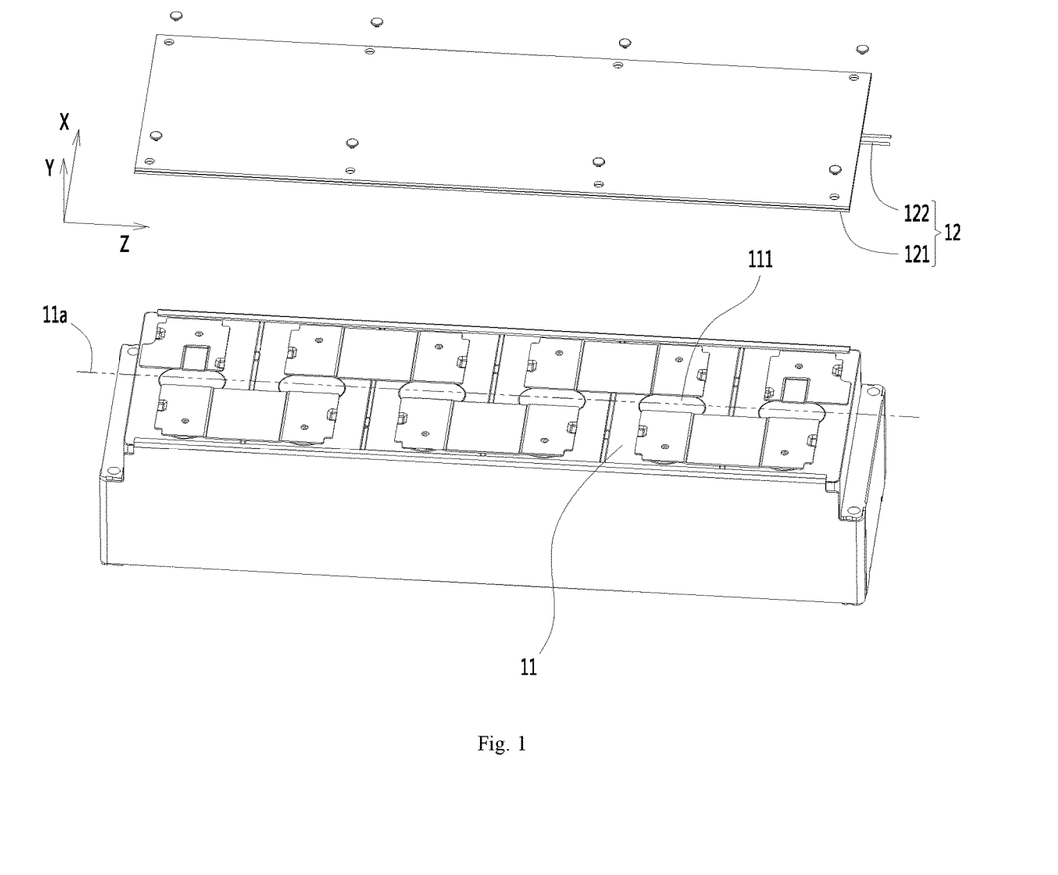
FIG. 1 is a schematic exploded view of a battery module according to an embodiment of the present disclosure.

On one aspect, as shown in FIG. 1, a battery module 1 according to an embodiment of the present disclosure includes a plurality of secondary batteries 11 and a monitoring assembly 12. The plurality of secondary batteries 11 are arranged side by side to form the battery module. Each of the secondary batteries 11 includes a vent 111. When an internal pressure of any of the secondary batteries 11 exceeds a predetermined pressure, the corresponding vent 111 may burst to relieve pressure, accompanied by ejection of a high-temperature substance, such as a high-temperature gas or a high-temperature electrolyte. In one example, each of the secondary batteries 11 is formed as a prismatic cell. The vent 111 has a circular or racetrack shape.

Figure 2:
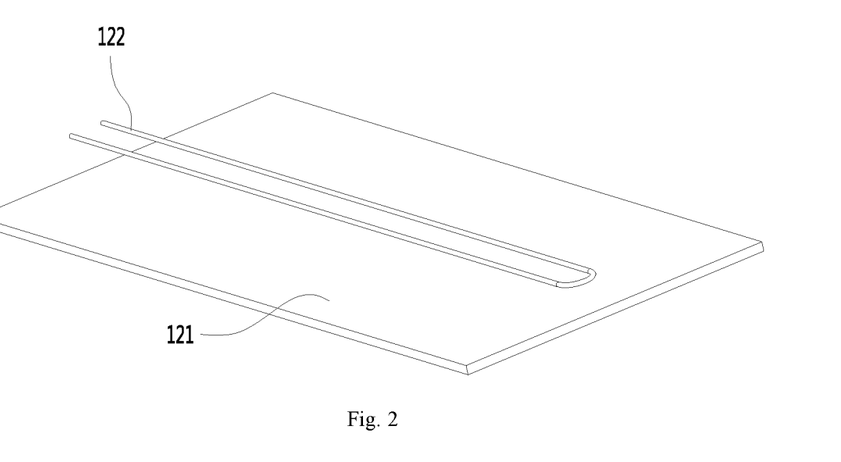
FIG. 2 is a schematic structural view of a monitoring assembly according to an embodiment of the present disclosure.
Figure 3:
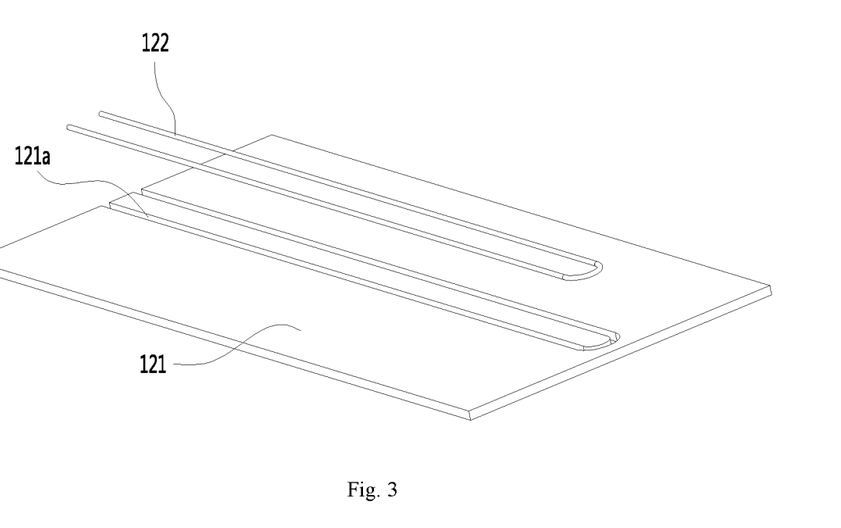
FIG. 3 is a schematic structural view of a monitoring assembly according to another embodiment of the present disclosure.
Figure 4:
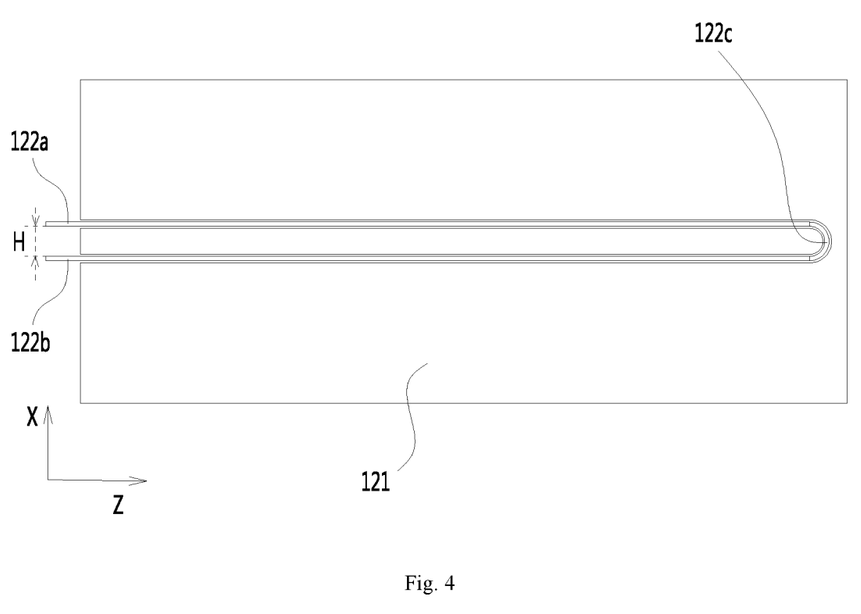
FIG. 4 is a schematic structural view of a monitoring assembly according to still another embodiment of the present disclosure.

The monitoring assembly 12 of the present embodiment is disposed above the secondary batteries 11. Referring to FIGS. 2 to 4, the monitoring assembly 12 includes a base plate 121 and a monitoring wire 122. The monitoring wire 122 is coupled to the base plate 121 such that the base plate 121 provides a supporting force for the monitoring wire 122, thereby reducing a possibility that the monitoring wire 122 displaces downward and electrically connects with the secondary batteries 11. The monitoring wire 122 is disposed corresponding to positions of the respective vents 111. In a normal state, the monitoring wire 122 itself constitutes a complete electrical circuit. When any of the vents 111 bursts, a high temperature or an impact force caused by the bursting can act on the monitoring wire 122, and cause the monitoring wire 122 to be fused or to be cut off by a shear force. As such, the monitoring wire 122 is broken off and a state of the battery module 1 can be monitored.

The battery module 1 according to the embodiment of the present disclosure can monitor operating states of the secondary batteries 11 in real time by providing the monitoring assembly 12. When any of the secondary batteries 11 bursts, the monitoring wire 122 in the monitoring assembly 12 will be broken off by the high temperature or the relatively large impact force, thereby timely feeding back a signal indicating the bursting of the secondary battery 11. As such, safety intervention measures can be taken timely to the battery module 1 to suppress a spread of the high-temperature substance ejected from the secondary battery 11, and meanwhile, the personnel can be warned and thus use safety of the battery module 1 can be improved.

In one embodiment, the battery module 1 further includes a battery management system (BMS) module. The monitoring wire 122 has two connection ends. The two connection ends are respectively connected to a positive terminal and a negative terminal of the BMS module. In a normal state, the monitoring wire 122 is energized, and thus a current flows through the monitoring wire 122. When the monitoring wire 122 is broken off and gets into an open-circuited state, the current flowing through the monitoring wire 122 is cut off. The BMS module can detect a signal of current change, and after that, the BMS module determines that a bursting of the secondary battery 11 occurs and automatically takes intervention measures or transmits an alarm signal to the outside.

In one embodiment, there may be 2 to 50 secondary batteries 11. Two or more secondary batteries 11 are electrically connected in series or in series and parallel.

In one embodiment, the base plate 121 may be a mica plate, which has a high brittleness and is easily broken when subjected to a large impact force. The base plate 121 further may be a plastic plate, which is easily melted under a high temperature and is easily broken when subjected to a large impact force. Thus, when a bursting of the secondary battery 11 occurs, the base plate 121 has a small blocking effect on the high-temperature substance, thereby ensuring that more high-temperature substance can act on the monitoring wire 122 and quickly break off the monitoring wire 122. The base plate 121 has a predetermined length, a predetermined width, and a predetermined thickness. In each of the embodiments, a width direction X of the base plate 121 is a direction corresponding to the width, a thickness direction Y of the base plate 121 is a direction corresponding to the thickness, and a length direction Z of the base plate 121 is a direction corresponding to the length. Optionally, the base plate 121 has a thickness of 0.5 mm to 2 mm.

In one embodiment, referring to FIG. 4, the monitoring wire 122 includes a first segment 122a and a second segment 122b spaced apart from each other in the width direction X. The monitoring wire 122 further includes an intermediate transition segment 122c that connects the first segment 122a and the second segment 122b. The first segment 122a and the second segment 122b are disposed corresponding to the positions of the respective vents 111. When any of the secondary batteries 11 bursts, the high-temperature substance may be ejected via the corresponding vent 111 and act on the first segment 122a and/or the second segment 122b to break off the first segment 122a and/or the second segment 122b. The first segment 122a and the second segment 122b may be mutually redundant, such that when the first segment 122a is not broken off, the second segment 122b may be broken off to achieve the monitoring function, or when the second segment 122b is not broken off, the first segment 122a may be broken off to achieve the monitoring function. In one example, a minimum spacing between the first segment 122a and the second segment 122b is indicated by H (referring to FIG. 4), and an outer diameter of the monitoring wire 122 is indicated by D (referring to FIG. 6), wherein $H/D \geq 2.5$. The minimum spacing refers to a minimum value among all the values of the spacing between the first segment 122a and the second segment 122b measured along a straight line in the width direction X. When H/D is less than 2.5, the minimum spacing between the first segment 122a and the second segment 122b is too small. Thus, in the case where the first segment 122a and/or the second segment 122b are melted due to the high temperature, it is possible for the molten materials of the melted first segment 122a and/or the second segment 122b to flow toward each other and resume an electrical connection of the first segment 122a and/or the second segment 122b, resulting in that the monitoring wire 122 fails to monitor the bursting of the secondary battery 11 and that the signal indicating the bursting of the secondary battery 11 cannot be normally fed back. Further, a too small minimum spacing between the first segment 122a and the second segment 122b will cause a too short creepage distance between the first segment 122a and the second segment 122b, thereby causing the first segment 122a and the second segment 122b easily to be broken down and connected to each other, thereby affecting the normal monitoring.

In one example, the monitoring wire 122 may be made of aluminum, copper, tin, etc. The monitoring wire 122 may have a cross section in a circular or polygonal shape. The outer diameter D of the monitoring wire 122 is in a range of $0.1 \text{ mm} \leq D \leq 2 \text{ mm}$. The outer diameter of the monitoring wire 122 refers to a length value of a straight line that passes through a center of the monitoring wire 122 in the cross section of the monitoring wire 122. In the case that the cross section of the monitoring wire 122 is in the circular shape, the outer diameter refers to a diameter of the monitoring wire 122. In the case that the cross section of the monitoring wire 122 is in the polygonal shape, the outer diameter refers to a maximum outer diameter, that is, the length value of the longest straight line passing through the center of the cross section. When the outer diameter of the monitoring wire 122 is less than 0.1 mm, the monitoring wire 122 has a low impact resistance and thus is easily broken off by an external impact force during assembly, which will cause a failure of the monitoring wire 122, and thus a failure of the monitoring of the secondary batteries 11. When the outer diameter of the monitoring wire 122 is greater than 2 mm, the monitoring wire 122 has a too high resistance to high temperature and a too high impact resistance, to be broken off by the high-temperature substance or by the external impact force, which will reduce a monitoring sensitivity and result in that the monitoring of the secondary batteries 11 cannot be realized by the way of opening-circuit the monitoring wire 122. Meanwhile, if the outer diameter of the monitoring wire 122 is greater than 2 mm, more installation space may be occupied, which will reduce an energy density of the battery module 1. The minimum spacing H between the first segment 122a and the second segment 122b is in a range of $5 \text{ mm} \leq H \leq 50 \text{ mm}$. When the minimum spacing H is less than 5 mm, the minimum spacing between the first segment 122a and the second segment 122b is too small. Thus, in the case where the first segment 122a and/or the second segment 122b are melted under the high temperature, it is possible for the molten materials of the melted first segment 122a and/or the second segment 122b to flow toward each other and resume the electrical connection of the first segment 122a and/or the second segment 122b, which in turn will cause a failure of the monitoring function. Further, a too small minimum spacing between the first segment 122a and the second segment 122b will cause a too short creepage distance between the first segment 122a and the second segment 122b, thereby causing the first segment 122a and the second segment 122b easily to be broken down and connected to each other, and thus affecting the normal monitoring of the monitoring wire 122. When the minimum spacing H is greater than 50 mm, the spacing between the first segment 122a and the second segment 122b is too large, and thus the first segment 122a and the second segment 122b are relatively far from centers of the vents 111. Therefore, the impact force directly acted on the first segment 122a and the second segment 122b by the high-temperature substance may be reduced, and the high-temperature substance may be cooled due to a long displacement distance and thus act on the first segment 122a and the second segment 122b with a lower temperature. As a result, it might be difficult for the first segment 122a and the second segment 122b to be fused by the high-temperature substance or to be cut off by the external impact force, thereby causing a failure of the monitoring wire 122 and thus a failure of the monitoring of the secondary batteries 11 by means of the open-circuit of the monitoring wire 122.

In one embodiment, referring to FIG. 1, the vent 111 has a center line 11a extending in the length direction Z of the base plate 121. The first segment 122a and the second segment 122b are respectively disposed on two sides of the center line 11a. Optionally, the first segment 122a and the second segment 122b of the monitoring wire 122 extend in the length direction Z. In one example, the monitoring wire 122 has a U-shaped configuration. By measuring along a straight line in the width direction X, the spacing values measured at the various positions between the first segment 122a and the second segment 122b are equal. In one example, the first segment 122a and the second segment 122b are identical in configuration, and are disposed in parallel. In another example, the first segment 122a and the second segment 122b are inclined toward a direction away from each other, such that the spacing between them gradually decreases or increases in the length direction Z.

In one embodiment, there may be two or more monitoring wires 122. The two or more monitoring wires 122 are arranged side by side in one direction, and are all disposed corresponding to the positions of the vents 111. The two or more monitoring wires 122 are manually redundant. When any of the secondary batteries 11 bursts, any of the two or more monitoring wires 122 can monitor the state of the secondary battery 11, thereby improving a monitoring accuracy. When any of the two or more monitoring wires 122 fails to monitor or fails to operate normally, the remaining monitoring wires 122 can normally complete the monitoring operation, thereby reducing a possibility of missing detection.

In one embodiment, referring to FIG. 2, the monitoring wire 122 is disposed directly on a surface of the base plate 121. Surfaces of the base plate 121 and the monitoring wire 122 coupled to each other are flat. The base plate 121 and the monitoring wire 122 are fixedly coupled in a snap fit manner or in a bonding manner. In another embodiment, as shown in FIG. 3, the base plate 121 is provided with a receiving portion 121a. The monitoring wire 122 is disposed in the receiving portion 121a. The monitoring wire 122 has an overall shape matching with a shape of the receiving portion 121a. When the monitoring wire 122 has a U-shaped configuration, the receiving portion 121a also has a U-shaped configuration. The receiving portion 121a is disposed corresponding to the positions of the vents 111. By receiving the monitoring wire 122 in the receiving portion 121a, on the one hand, it is conducive to improving a structural compactness, saving space, and improving the energy density of the battery module 1, and on the other hand, the monitoring wire 122 is restrained by the base plate, which can improve a positional stability of the monitoring wire 122, reduce a possibility that the monitoring wire 122 is displaced and cannot maintain to correspond to the positions of the vents 111, and reduce a possibility that the high-temperature substance cannot act on the displaced monitoring wire 122, thereby causing the monitoring failure.

Figure 5:
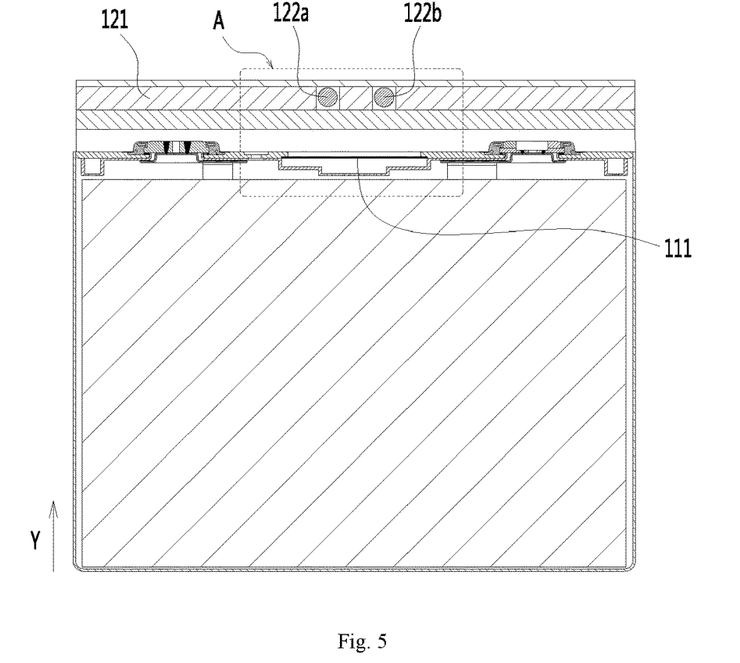
FIG. 5 is a cross-sectional structural view of a battery module according to an embodiment of the present disclosure.
Figure 6:
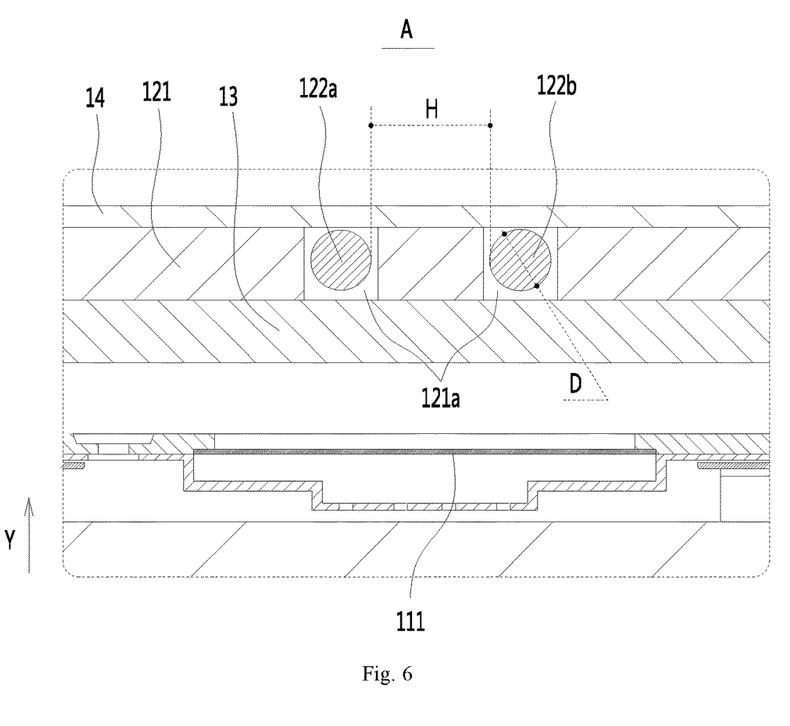
FIG. 6 is an enlarged view of a portion A in FIG. 5.

In one embodiment, as shown in FIGS. 5 and 6, the receiving portion 121a penetrates the base plate 121 in the thickness direction Y of the base plate 121. The receiving portion 121a extends in the length direction Z. The monitoring wire 122 is disposed directly corresponding to the vents 111 of the secondary batteries 11. When any of the secondary batteries 11 bursts, the internal high-temperature substance can directly act on the monitoring wire 122, and the monitoring wire 122 can be quickly fused or cut off by the external impact force, thereby breaking off the monitoring wire 122, which is conducive to shortening monitoring time. A maximum dimension of the monitoring wire 122 in the thickness direction Y is smaller than the thickness of the base plate 121, and the monitoring wire 122 is disposed in the receiving portion 121a. In the thickness direction Y, the monitoring wire 122 is not protruded out of the base plate 121, and thus can be protected by the base plate 121, thereby reducing a possibility that the monitoring wire 122 is accidentally broken off by an external force during assembly or later use. Further, the monitoring wire 122 does not occupy more installation space in the thickness direction Y, which can improve an overall structural compactness of the monitoring assembly 12, thereby improving the energy density of the battery module 1.

Figure 7:
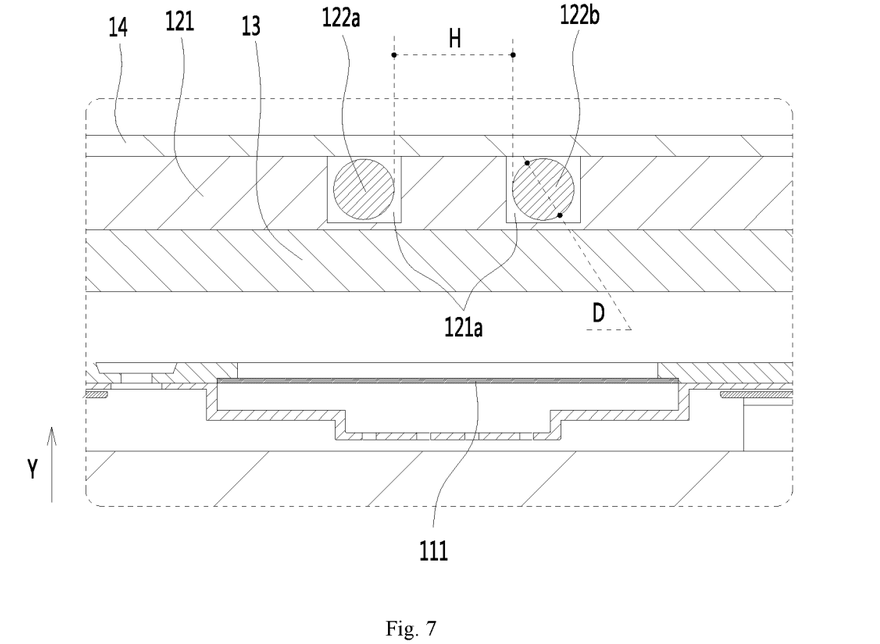
FIG. 7 is a partial cross-sectional structural view of a battery module according to an embodiment of the present disclosure.

In another embodiment, referring to FIG. 7, the receiving portion 121a is formed as a groove recessed in the thickness direction Y of the base plate 121. The groove has a bottom wall without penetrating the base plate 121. The base plate 121 can provide a supporting force for the monitoring wire 122 in the thickness direction Y. When vibration occurs during use of the battery module 1, it is not easy for the monitoring wire 122 to disengage from the groove. In the present embodiment, the base plate 121 itself may be melted under high temperature or may be broken by an impact force. In one example, the groove extends along a straight line in the length direction Z to form a strip-like groove. The monitoring wire 122 is also formed in a strip-like configuration entirely, which matches with the shape of the groove.

Figure 8:
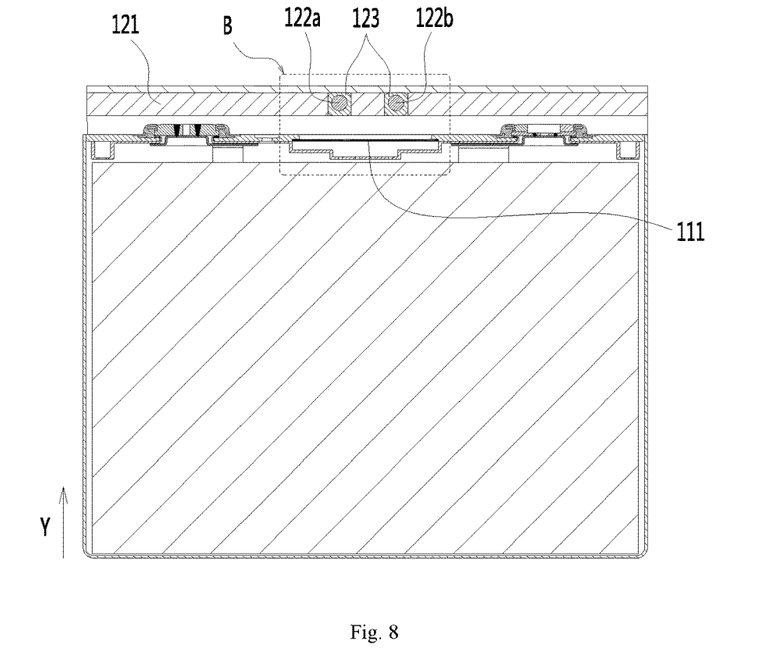
FIG. 8 is a cross-sectional structural view of a battery module according to another embodiment of the present disclosure.
Figure 9:
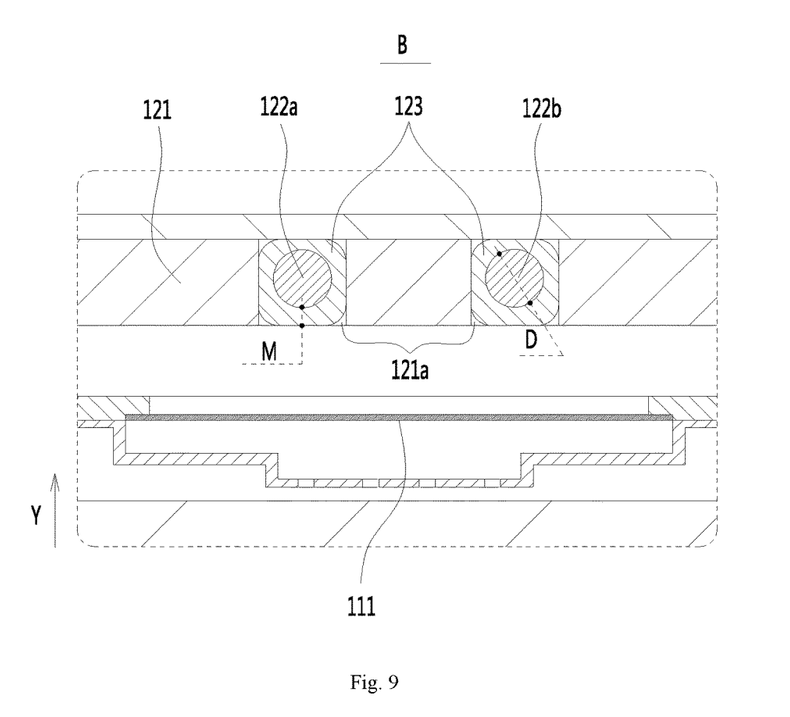
FIG. 9 is an enlarged view of a portion B in FIG. 8.

In one embodiment, referring to FIGS. 8 and 9, the monitoring assembly 12 further includes an insulating layer 123 that encloses the monitoring wire 122. The insulating layer 123 is filled in the receiving portion 121a. The monitor wire 122 is coupled to the base plate 121 via the insulating layer 123. When any of the vents 111 bursts, the insulating layer 123 can be melted or broken. The insulating layer 123 can insulate the monitoring wire 122 from adjacent energized components, and prevent a short circuit caused by contact between the monitoring wire 122 and the adjacent energized components. The insulating layer 123 can fill a gap between the monitor wire 122 and the base plate 121, thereby improving the positional stability of the monitor wire 122. The insulating layer 123 can reduce a possibility of a breakdown and short circuit of the first segment 122a and the second segment 122b. When any of the secondary batteries 11 bursts, the high-temperature substance can first melt or break the insulating layer 123 to expose the internal monitoring wire 122, and then the high-temperature substance fuses or cut off the monitoring wire 122.

In one embodiment, a thickness of the insulating layer 123 is indicated by M, and a maximum outer diameter of the monitoring wire 122 is indicated by D, wherein $0.05 \leq M/D \leq 10$. When the M/D is less than 0.05, the insulating layer 123 is too thin, resulting in that the insulating property thereof may be deteriorated, and a possibility of occurrence of insulation failure may be increased. When the M/D is greater than 10, the insulating layer 123 is too thick, resulting in that when any of the vents 111 bursts, the high-temperature substance is easily blocked by the insulating layer 123, and it is difficult to quickly melt or break the insulating layer 123, thereby prolonging the monitoring time required by the monitoring wire 122. In one example, the thickness value measured at any position of the insulating layer 123 is M. In another example, in the thickness direction Y, a thickness of a portion of the insulating layer 123 disposed below the monitoring wire 122 is M. The thickness value M of the portion of the insulating layer 123 disposed below the monitoring wire 122 is obtained by measuring along a straight line in the thickness direction Y.

In one embodiment, the thickness of the insulating layer 123 is indicated by M, wherein 0.1 mm≤M≤1 mm. The insulating layer 123 may be made of a polymer material, such as polyethylene, polypropylene or polyester, or may be made of ceramic or mica. The insulating layer 123 has an insulating property greater than 500 MΩ. When the thickness of the insulating layer 123 is less than 0.1 mm, the insulation performance of the insulating layer 123 is low, which may increase a possibility that the first segment 122a and the second segment 122b are broken down and short-circuited. As a result, an error alarm may be sent out, and the monitoring accuracy may be reduced. When the thickness of the insulating layer 123 is greater than 1 mm, it is more difficult to melt or break the insulating layer 123, resulting in that when any of the secondary batteries 11 occurs, the insulating layer 123 fails to be melted or broken to expose the monitoring wire 122. As a result, the first segment 122a and the second segment 122b cannot be open-circuited, the monitoring wire cannot complete the monitoring operation normally, and the bursting of the secondary battery 11 cannot be detected.

In one embodiment, referring to FIG. 6 or FIG. 7, the monitoring assembly 12 further includes a protective plate 13. The protective plate 13 is disposed on a side of the base plate 121 close to the secondary battery 11 in the thickness direction Y of the base plate 121. The protective plate 13 can provide additional protection. When any of the secondary batteries 11 bursts, the protective plate 13 can prevent an outward diffusion of the high-temperature substance and improve the safety of the battery module 1. The protective plate 13 may be fixedly coupled to the base plate 121, and the base plate 121 and the protective plate 13 are stacked in the thickness direction Y. Optionally, the protective plate 13 is made of a high temperature resistant and high strength insulating material, such as mica, ceramic, and a composite material. Optionally, the base plate 121 and the protective plate 13 are bonded by a high temperature resistant adhesive, such as silicone adhesive, high temperature epoxy adhesive, organosilicon, or phenolic.

In one embodiment, referring to FIG. 6 or FIG. 7, the monitoring assembly 12 further includes an isolating plate 14. The isolating plate 14 is disposed on a side of the base plate 121 away from the secondary batteries 11 in the thickness direction Y of the base plate 121. The isolating plate 14 isolates the secondary batteries 11 from the monitoring assembly 12. The isolating plate 14 may be fixedly coupled to the base plate 121, and the base plate 121 and the isolating plate 14 are stacked in the thickness direction Y. When a bursting of any of the secondary batteries 11 occurs, the high-temperature substance first melts or breaks the isolating plate 14, and then fuses or cuts off the monitoring wire 122. Optionally, the isolating plate 14 is made of an insulating material such as mica or plastic. Optionally, the base plate 121 and the isolating plate 14 are bonded by a high temperature resistant adhesive, such as silicone adhesive, high temperature epoxy adhesive, organosilicon, or phenolic.

The battery module 1 according to the embodiments of the present disclosure can monitor the states of the secondary batteries 11 in real time by providing the monitoring assembly 12. The monitoring assembly 12 includes the base plate 121 and the monitoring wire 122, and the monitoring wire 122 itself constitutes a complete circuit. When any of the secondary batteries 11 bursts and the high-temperature substance is ejected, the monitoring wire 122 included in the monitoring assembly 12 is fused or cut off and thus is broken off. In this case, the monitoring wire 122 cannot transmit an electrical signal any more, and a signal indicating the bursting of the secondary battery 11 can be timely fed back, which facilitates to timely take safety intervention measures to the battery module 1 and timely suppress the spread of the high-temperature substance ejected from the secondary battery 11, thereby improving the use safety of the battery module 1.

Figure 10:
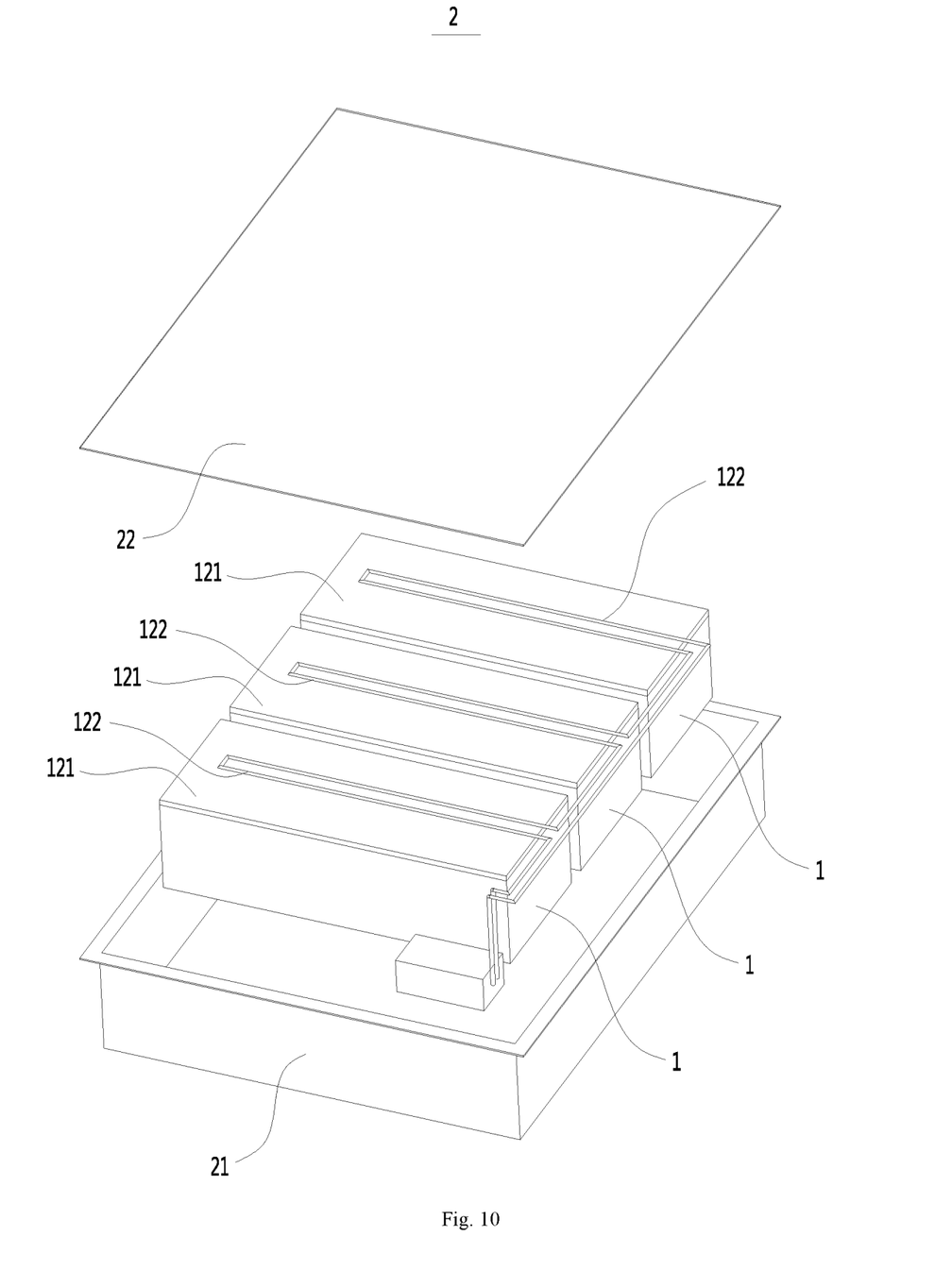
FIG. 10 is a schematic exploded view of a battery pack according to an embodiment of the present disclosure.

Referring to FIG. 10, according to an embodiment of the present disclosure, a battery pack 2 includes the battery module 1 according to any of the above embodiments. In one embodiment, the battery pack 2 includes two or more battery modules 1. The monitoring wires 122 included in the two or more battery modules 1 are connected in series. After all the monitoring wires 122 are connected in series, a main input terminal and a main output terminal are respectively connected to the positive terminal and the negative terminal of the battery management system module, and thus all the battery modules 1 are monitored in real time.

The battery pack 2 according to the embodiment of the present disclosure can monitor the states of the battery modules 1 in real time by the monitoring assembly 12. When any of the secondary batteries 11 bursts and a high-temperature substance is ejected, the monitoring wire 122 included in the monitoring assembly 12 is fused or cut off and thus is broken off. In this case, the monitoring wire 122 cannot transmit an electrical signal any more, and a signal indicating the bursting of the secondary battery 11 can be timely fed back, which facilitates to timely take safety intervention measures to the battery pack 2 and timely suppress the spread of the high-temperature substance ejected from the battery module 1, thereby improving the use safety of the battery pack 2.

In one embodiment, the battery pack 2 further includes a case 21 and a cover 22. The case 21 has an accommodating chamber for accommodating the battery module 1. After the battery module 1 is placed in the accommodating chamber of the case 21, the case 21 and the cover 22 are fixedly coupled to each other.

Figure 11:
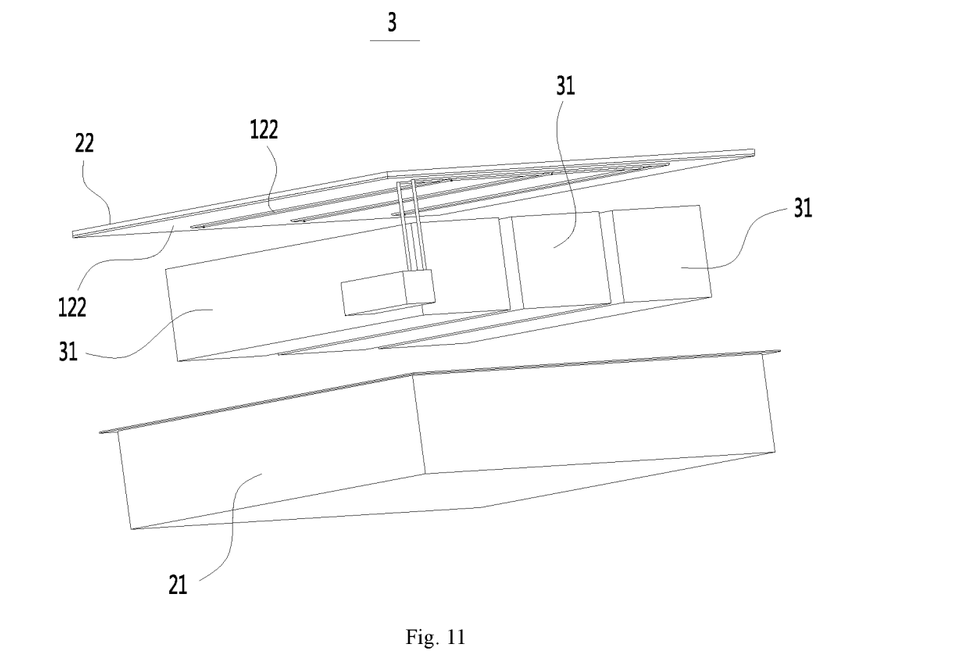
FIG. 11 is a schematic exploded view of a battery pack according to another embodiment of the present disclosure.
Figure 12:
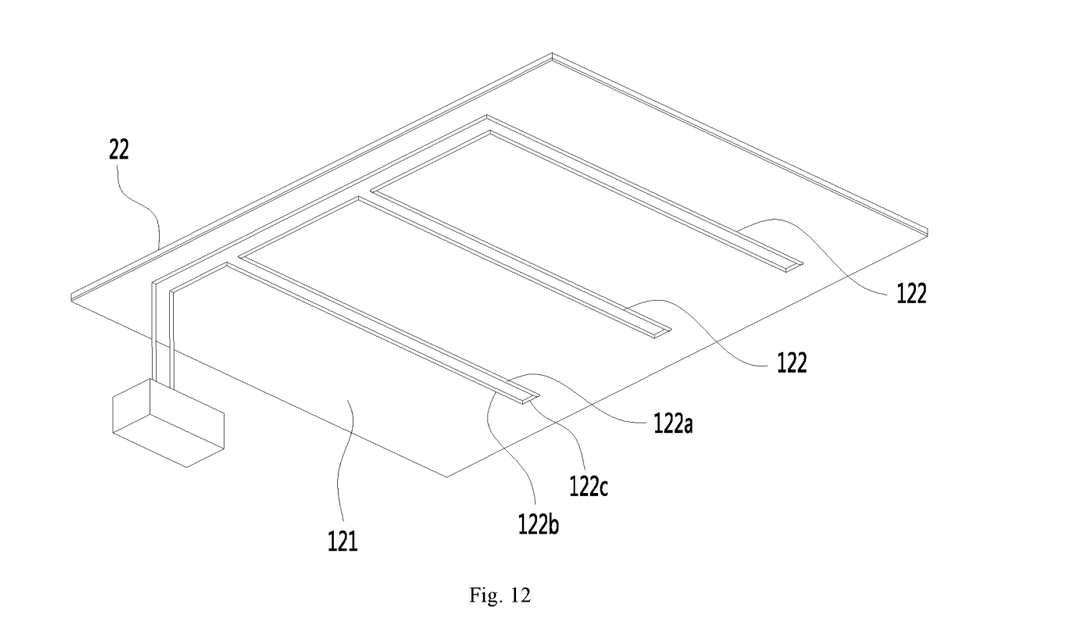
FIG. 12 is a schematic view showing a connection state of a cover and a monitoring assembly according to an embodiment of the present disclosure.

In one embodiment, referring to FIG. 11 and FIG. 12, an embodiment of the present disclosure further discloses a battery pack 3 including a battery unit 31, a cover 22, and a monitoring assembly 12. The cover 22 is disposed above the battery unit 31. The monitoring assembly 12 is disposed on the cover 22. The monitoring assembly 12 includes a base plate 121 and a monitoring wire 122. The monitoring wire 122 is coupled to the base plate 121. When a bursting of the battery unit 31 occurs, the monitoring wire 122 can be broken off to achieve monitoring of a state of the battery unit 31.

In one embodiment, the battery unit 31 may be a single secondary battery 11, the battery module 1 according to any of the above embodiments, or a battery module of the prior art.

In one embodiment, the base plate 121 of the monitoring assembly 12 is adhesively coupled to the cover 22. Optionally, the base plate 121 and the cover 22 are bonded by a high temperature resistant adhesive, such as silicone adhesive, high temperature epoxy adhesive, organosilicon, or phenolic.

In one embodiment, the battery pack 3 further includes a case 21. The case 21 has an accommodating chamber for accommodating the battery unit 31. After the battery unit 31 is placed in the accommodating chamber of the case 21, the case 21 and the cover 22 are fixedly coupled to each other.

The battery pack 3 according to the embodiment of the present disclosure can monitor the state of the battery unit 31 in real time by providing the monitoring assembly 12. The monitoring assembly 12 includes the base plate 121 and the monitoring wire 122. In a normal state, the monitoring wire 122 itself constitutes a complete circuit. When the battery unit 31 bursts and the high-temperature substance is ejected from the battery unit 31, the monitoring wire 122 included in the monitoring assembly 12 is fused or cut off and thus is broken off. In this case, the monitoring wire 122 cannot transmit an electrical signal any more, and a signal indicating the bursting of the battery unit 31 can be timely fed back, which facilitates to timely take safety intervention measures to the battery pack 3 and timely suppress the spread of the high-temperature substance ejected from the battery unit 31, thereby improving the use safety of the battery pack 3.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A battery module, comprising:
   a plurality of secondary batteries arranged side by side, each of which comprises a vent;
   a monitoring assembly, disposed above the plurality of secondary batteries and comprising a base plate and a monitoring wire, wherein the monitoring wire is coupled to the base plate; the monitoring wire is disposed corresponding to positions of the vents of the plurality of secondary batteries, and can be broken off when any of the vents bursts, so as to monitor a state of the battery module,
   wherein the monitoring wire comprises a first segment and a second segment spaced apart from each other in a width direction of the base plate, the vent of each of the plurality of secondary batteries has a center line extending in a length direction of the base plate, and the first segment and the second segment are respectively disposed on two sides of the center line, and
   a minimum spacing between the first segment and the second segment is indicated by H, and an outer diameter of the monitoring wire is indicated by D, wherein H/D≥2.5.

2. The battery module according to claim 1, wherein the monitoring wire has a U-shaped configuration.

3. The battery module according to claim 1, wherein the outer diameter D of the monitoring wire is in a range of 0.1 mm≤D≤2 mm, and the minimum spacing H between the first segment and the second segment is in a range of 5 mm≤H≤50 mm.

4. The battery module according to claim 1, wherein the base plate is provided with a receiving portion, in which the monitoring wire is disposed, and the monitoring wire has a shape matching with a shape of the receiving portion.

5. The battery module according to claim 4, wherein the receiving portion is formed as a groove recessed in a thickness direction of the base plate, and the groove has a bottom wall without fully penetrating the base plate.

6. The battery module according to claim 4, wherein the receiving portion penetrates the base plate in a thickness direction of the base plate, wherein a maximum dimension of the monitoring wire in the thickness direction of the base plate is smaller than a thickness of the base plate, and the monitoring wire is disposed in the receiving portion.

7. The battery module according to claim 4, wherein the monitoring assembly further comprises an insulating layer enclosing the monitoring wire, and the insulating layer is filled in the receiving portion, wherein the monitoring wire is coupled to the base plate via the insulating layer.

8. The battery module according to claim 7, wherein the insulating layer has a thickness indicated by M, and a maximum outer diameter of the monitoring wire is indicated by D, wherein 0.05≤M/D≤10.

9. The battery module according to claim 8, wherein a portion of the insulating layer disposed below the monitoring wire has a thickness in the thickness direction equal to M.

10. The battery module according to claim 8, wherein the thickness M of the insulating layer is in a range of 0.1 mm≤M≤1 mm.

11. The battery module according to claim 9, wherein the thickness M of the insulating layer is in a range of 0.1 mm≤M≤1 mm.

12. The battery module according to claim 1, wherein the monitoring assembly further comprises a protective plate, which is disposed on a side of the base plate close to the plurality of secondary batteries in a thickness direction of the base plate.

13. The battery module according to claim 1, wherein the monitoring assembly further comprises an isolating plate, which is disposed on a side of the base plate away from the plurality of secondary batteries in a thickness direction of the base plate.

14. A battery pack, comprising a battery module according to claim 1.

15. The battery pack according to claim 14, wherein there are two or more battery modules, and the monitoring wires included in the two or more battery modules are connected in series.

16. The battery pack according to claim 14, wherein the monitoring wire has a U-shaped configuration.

17. A battery pack, comprising:
   a battery unit;
   a cover, disposed above the battery unit; and
   a monitoring assembly, which is disposed on the cover and comprises a base plate and a monitoring wire, wherein the monitoring wire is coupled to the base plate, and when the battery unit bursts, the monitoring wire can be broken off to monitor a state of the battery unit,
   wherein the monitoring wire comprises a first segment and a second segment spaced apart from each other in a width direction of the base plate, the battery unit comprises a vent, the vent has a center line extending in a length direction of the base plate, and the first segment and the second segment are respectively disposed on two sides of the center line, and
   a minimum spacing between the first segment and the second segment is indicated by H, and an outer diameter of the monitoring wire is indicated by D, wherein H/D≥2.5.

* * * * *